United States Patent
Raffle et al.

(10) Patent No.: US 9,664,902 B1
(45) Date of Patent: May 30, 2017

(54) ON-HEAD DETECTION FOR WEARABLE COMPUTING DEVICE

(71) Applicant: Google Inc., Mountain View, CA (US)

(72) Inventors: Hayes Solos Raffle, Palo Alto, CA (US); David Sparks, Cupertino, CA (US); Bo Wu, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 457 days.

(21) Appl. No.: 14/173,598

(22) Filed: Feb. 5, 2014

(51) Int. Cl.
  *G02B 1/00* (2006.01)
  *G02B 27/01* (2006.01)
  *G06F 3/01* (2006.01)
  *G06F 3/041* (2006.01)

(52) U.S. Cl.
  CPC ............. *G02B 27/01* (2013.01); *G06F 3/013* (2013.01); *G06F 3/041* (2013.01)

(58) Field of Classification Search
  CPC .......... G06F 3/011; G06F 3/041; G06F 3/044; G02B 27/0172; G02B 27/01; G02B 27/017
  See application file for complete search history.

(56) References Cited

U.S. PATENT DOCUMENTS

| | | | | |
|---|---|---|---|---|
| 8,866,702 B1* | 10/2014 | Wong | ................... | G02B 27/017 345/7 |
| 2002/0185999 A1* | 12/2002 | Tajima | ................... | G06F 3/011 324/76.75 |
| 2006/0103591 A1 | 5/2006 | Tanimura et al. | | |
| 2007/0279238 A1* | 12/2007 | Smith | ................... | G01S 17/026 340/686.6 |
| 2008/0300016 A1* | 12/2008 | Nickel | ................... | G06F 3/011 455/556.2 |
| 2010/0110368 A1* | 5/2010 | Chaum | ................ | G02B 27/017 351/158 |
| 2011/0080289 A1* | 4/2011 | Minton | ................ | G02B 27/017 340/573.1 |
| 2011/0194029 A1* | 8/2011 | Herrmann | ............ | G02B 27/017 348/569 |
| 2011/0221896 A1 | 9/2011 | Haddick et al. | | |
| 2012/0023353 A1* | 1/2012 | Lee | ....................... | G06F 1/3231 713/323 |
| 2012/0050275 A1 | 3/2012 | Matsui et al. | | |
| 2012/0056847 A1 | 3/2012 | Milford | | |

* cited by examiner

*Primary Examiner* — Michael Faragalla
(74) *Attorney, Agent, or Firm* — McDonnell Boehnen Hulbert & Berghoff LLP

(57) ABSTRACT

Disclosed are methods and devices for varying functionality of a wearable computing device. An example device includes a first sensor and a second sensor. An example method includes, while a device is operating in a first state, receiving an indication of a touch input at the first sensor. The second sensor is configured in an idle mode based on the device operating in the first state. The method further includes, in response to receiving the indication of the touch input, triggering the second sensor to operate in an active mode and receiving data from the second sensor. The method further includes determining, based on the data, whether the device is being worn.

23 Claims, 10 Drawing Sheets

ON-HEAD DETECTION FOR WEARABLE COMPUTING DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A wearable computing device may be configured to execute any number of functions, such as displaying information, communicating with one or more other devices, emitting audio, visual, and/or haptic notifications, receiving inputs, and detecting an environment around the wearable computing device. In performing these functions, the wearable computing device may consume battery power supplied by one or more batteries in the wearable computing device.

When the wearable computing device is not being worn by a user, it may be desirable for the wearable computing device to cease executing some functions and/or to execute some functions with a reduced frequency. In this manner, the wearable computing device may provide a more desirable user experience to the user and, further, may conserve battery power, thereby improving the battery life of the head-mountable computing device.

Disclosed are systems and methods for sensing whether a wearable computing device is being worn by a user. An example system may take the form of a wearable computing device that includes a first sensor and a second sensor. The second sensor may be inward-facing on the wearable computing device. The wearable computing device may further include a processor and data storage including instructions, and the instructions may be executable by the processor to carry out functions. The functions may include, while the wearable computing device is operating in a first state, the wearable computing device receiving an indication of a touch input at the first sensor. The second sensor may be configured in an idle mode based on the wearable computing device operating in the first state. The functions may further include, in response to receiving the indication of the touch input, the wearable computing device triggering the second sensor to operate in an active mode and receiving data from the second sensor. Based on the data from the second sensor, the wearable computing device may determine whether the wearable computing device is being worn.

In another aspect, an example method is disclosed that may include, while a head-mountable device (HMD) is operating in a first state, receiving an indication of a touch input at a first sensor on the HMD. An inward-facing second sensor of the HMD may be configured in an idle mode based on the HMD operating in the first state. The method may further include, in response to receiving the indication of the touch input, the HMD triggering the second sensor to operate in an active mode and receiving data from the second sensor. The method may still further include determining, based on the data from the second sensor, whether the HMD is being worn.

In yet another aspect, a computer readable storage memory is disclosed having stored therein instructions that, when executed by a processor, cause the processor to perform functions that include, while an HMD is operating in a first state, receiving an indication of a touch input at a first sensor on the HMD. An inward-facing second sensor of the HMD may be configured in an idle mode based on the HMD operating in the first state. The functions may further include, in response to receiving the indication of the touch input, the HMD triggering the second sensor to operate in an active mode and receiving data from the second sensor. The functions may still further include determining, based on the data from the second sensor, whether the HMD is being worn.

In yet another aspect, an example device is disclosed that may include means for detecting a touch input and means for sensing data. The means for sensing data may be configured to operate in an idle mode based on the device operating in a first state. While operating in the first state, the device may receive an indication of the touch input. In response to receiving the indication of the touch input, the device may trigger the means for sensing the data to operate in an active mode and may receive the data. The device may further include means for determining, based on the data, whether the device is being worn.

These as well as other aspects, advantages, and alternatives will become apparent to those of ordinary skill in the art by reading the following detailed description, with reference where appropriate to the accompanying drawings.

DETAILED DESCRIPTION

Figure 1A:
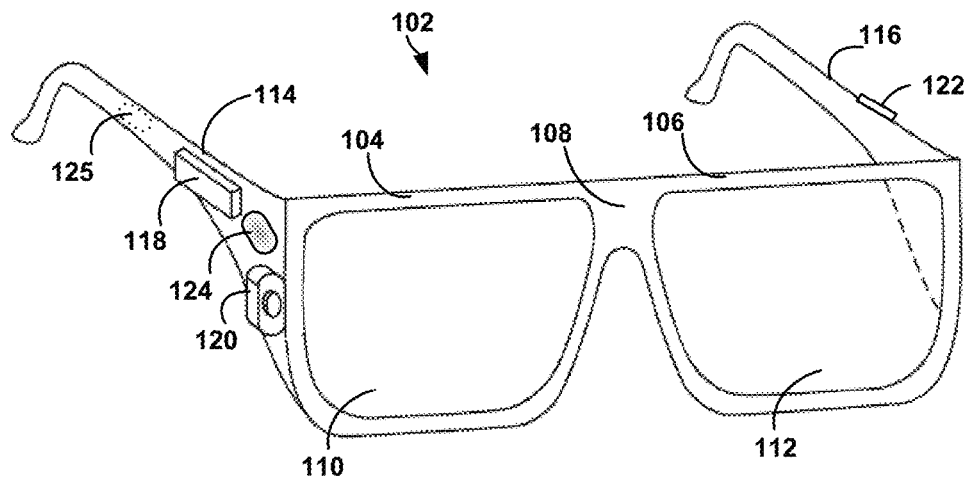
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A wearable computing device may be designed to execute any number of functions. For example, a wearable computing device may be designed to display information, communicate with other devices (e.g., by forwarding telephone calls to a cellular telephone and/or by sharing documents or photographs with another computing device), emit audio, visual, and/or haptic (e.g., vibration) notifications to a user, receive inputs (e.g., voice commands, user inputs through a touch pad, telephone calls forwarded from a cellular telephone, and/or documents or photographs shared from another computing device), and detect an environment around the wearable computing device (e.g., using sensors that detect sound, light, or other information). In performing these functions, the wearable computing device may consume battery power supplied by, for example, batteries included in the wearable computing device.

When the wearable computing device is not being worn by a user, it may be desirable for the wearable computing device to cease executing some functions and/or to execute some functions less frequently. For example, when the wearable computing device is not being worn by the user it may be desirable for the wearable computing device to cease displaying information to the user in order to extend battery life. As another example, when the wearable computing device is not being worn by the use, it may be desirable for the wearable computing device to cease accepting forwarded telephone calls from a cellular telephone, as the user may not be able to answer when the user is not wearing the wearable computing device. As still another example, when the wearable computing device is not being worn it may be desirable for some or all of the sensors to detect information less frequently in order to extend battery life. Other examples are possible as well.

To this end, the wearable computing device may be configured to operate in a first state and in a second state. In the first state, the wearable computing device may execute fewer functions and/or may execute some functions less frequently than in the second state, as described above. Alternatively or additionally, in the first state the wearable computing device may consume more power than in the second state. Still alternatively or additionally, the wearable computing device may be "locked" in the first state, such that the wearable computing device does not accept certain inputs, while the wearable computing device may be "unlocked" in the second state. Other variations between the first state and the second state are possible as well.

In order to determine whether to operate in the first state or the second state, the wearable computing device could rely on a single sensor to detect whether the wearable computing device is being worn. However, with a single sensor, the wearable computing device may be susceptible to erroneous sensor readings. For example, if the wearable computing device relies only on a proximity sensor, such as an optical or capacitive sensor, the wearable computing device may incorrectly detect that it is being worn when the wearable computing device is, e.g., worn on top of a user's head, or in other situations.

Thus, to minimize such erroneous sensor readings, a wearable computing device may include both first sensor and a second sensor. The first sensor may be configured to detect a touch input at the first sensor. To this end, the first sensor may be, for example, a capacitive sensor. The second sensor may be configured to detect whether the wearable computing device is being worn. To this end, the second sensor may be, for example, a proximity sensor that can detect when the wearable computing device is proximate to, for instance, an eye of a user. The second sensor may be positioned on the wearable computing device so as to face inward (e.g., toward an eye of a user when the wearable computing device is being worn).

The second sensor may operate in an idle mode when the wearable computing device operates in the first state. When the wearable computing device receives an indication of a touch input at the first sensor, the wearable computing device may trigger the second sensor to operate in an active mode and may receive data from the second sensor. If the data indicates that the wearable computing device is being worn, the wearable computing device may operate in the second state. On the other hand, if the data does not indicate that the wearable computing device is being worn, the wearable computing device may operate in the first state.

Example wearable computing devices and example methods for use with the wearable computing devices are described below.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
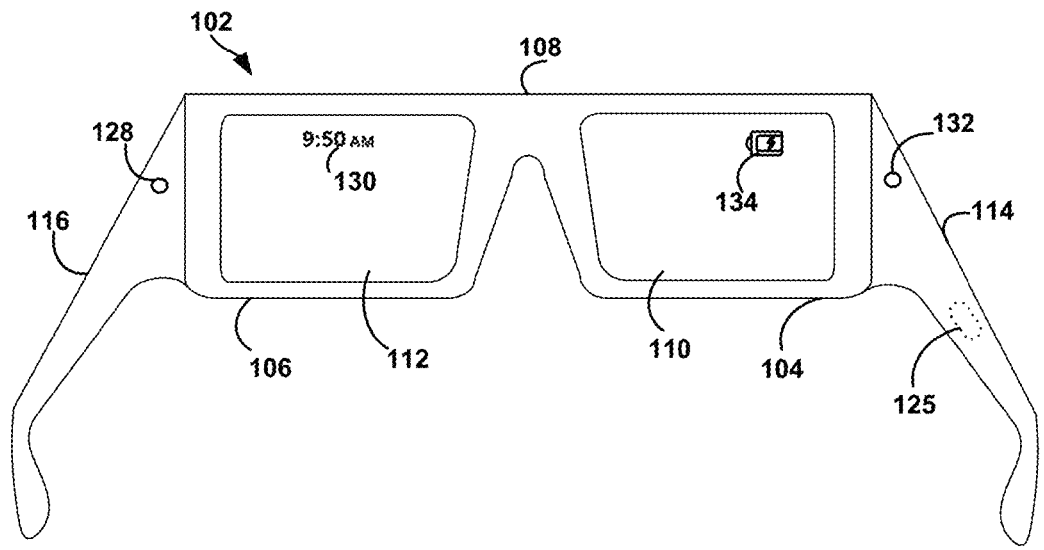
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
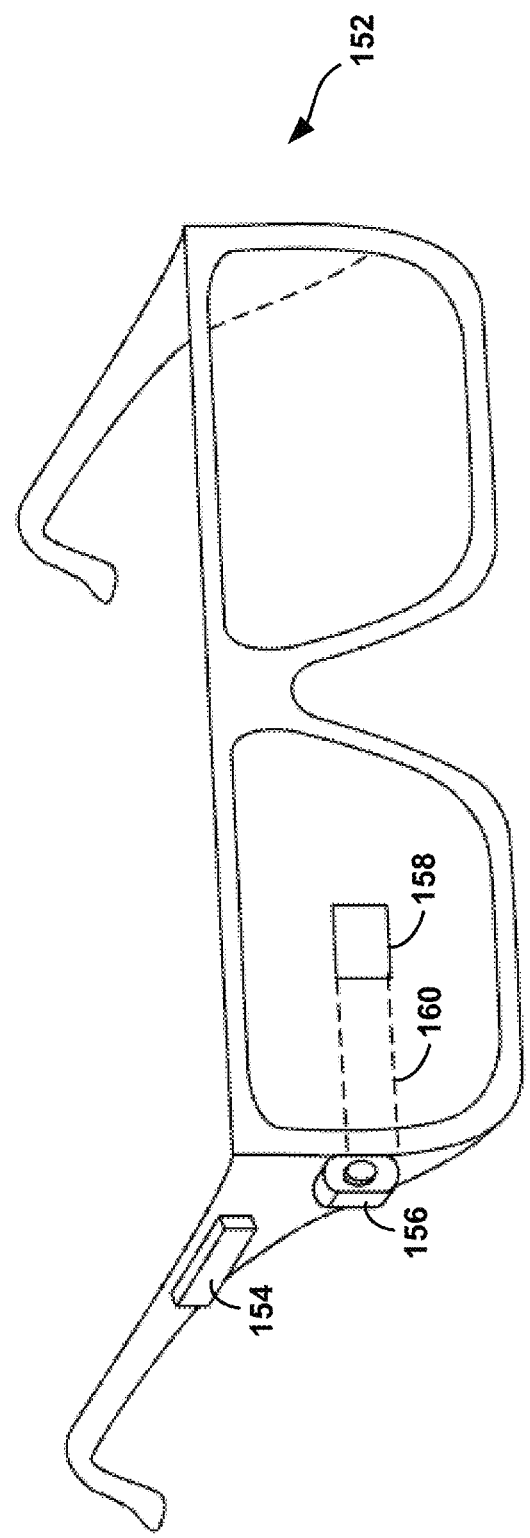
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
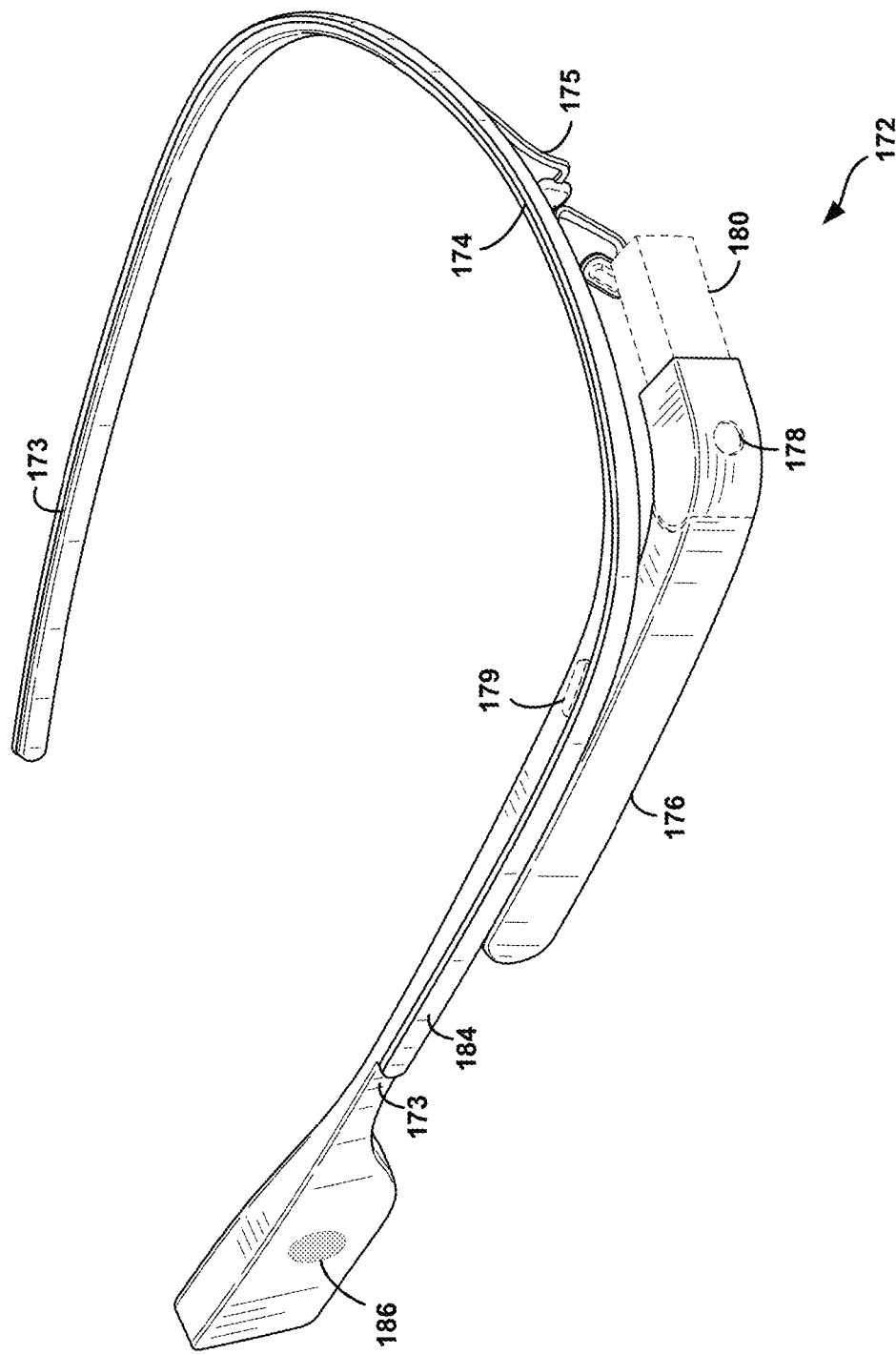
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
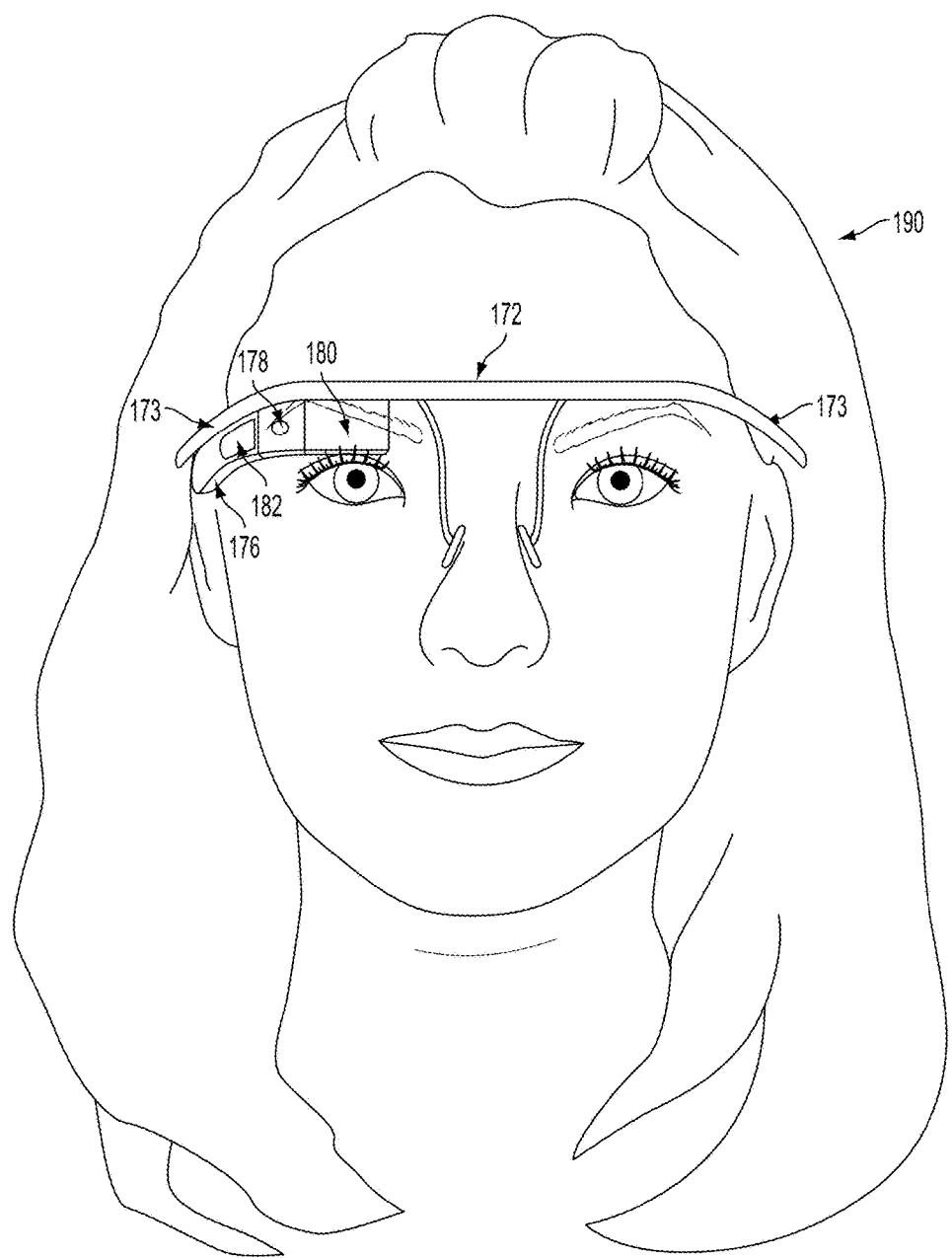
FIGS. 1E to 1G are simplified illustrations of the wearable computing system shown in FIG. 1D, being worn by a wearer.
Figure 1F:
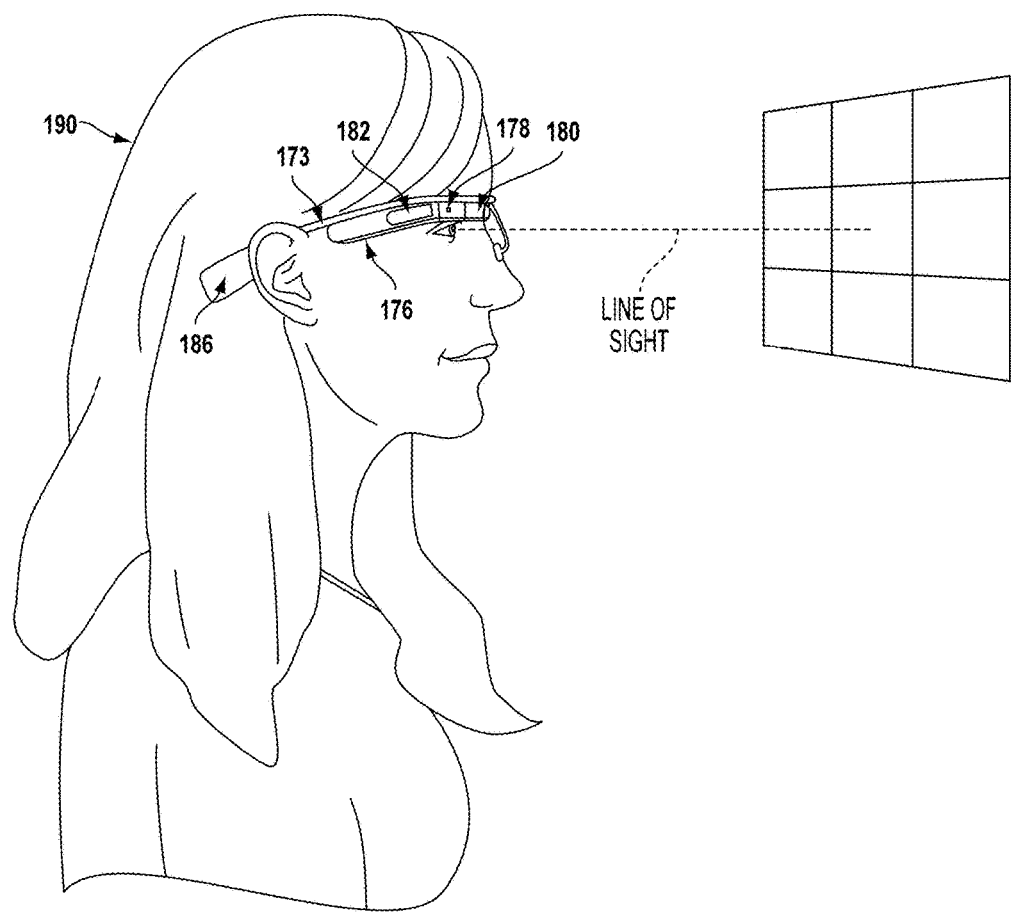
Figure 1G:
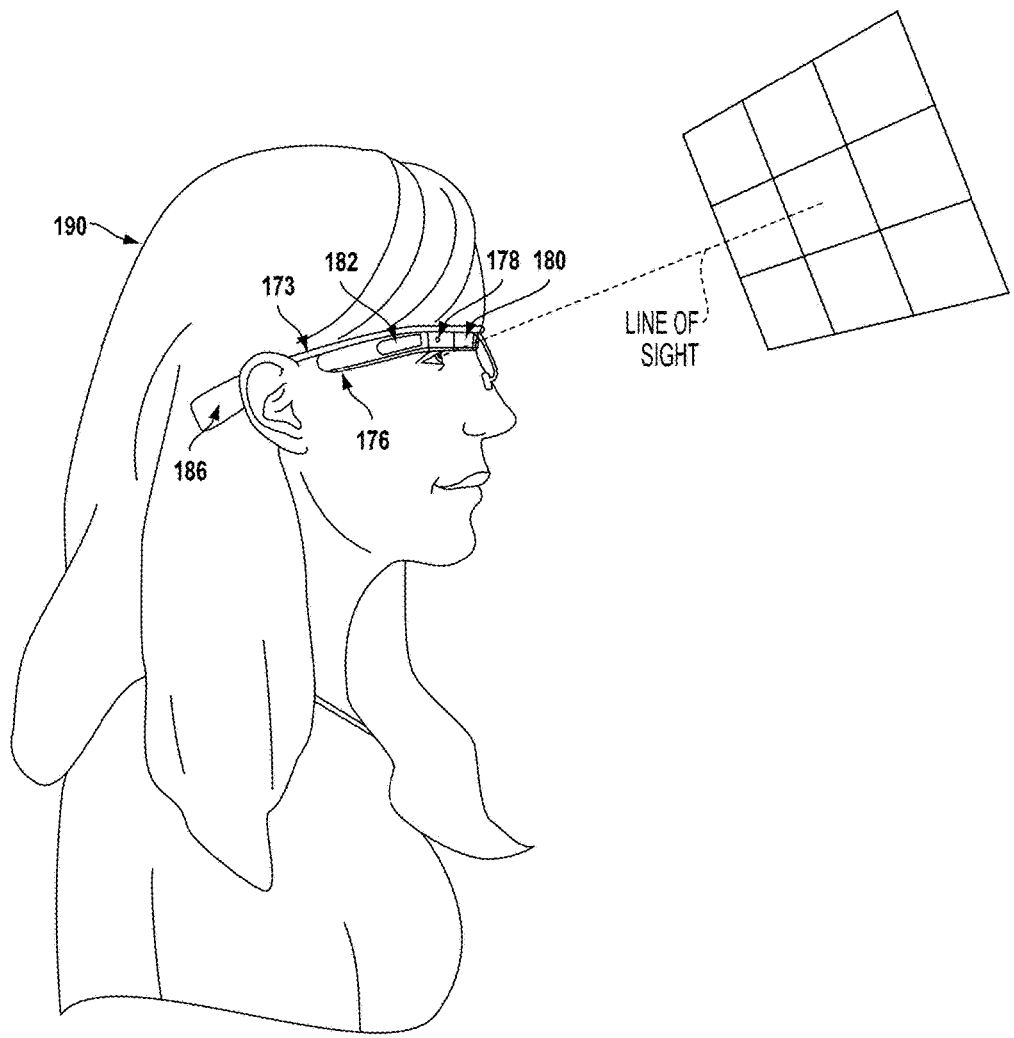

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
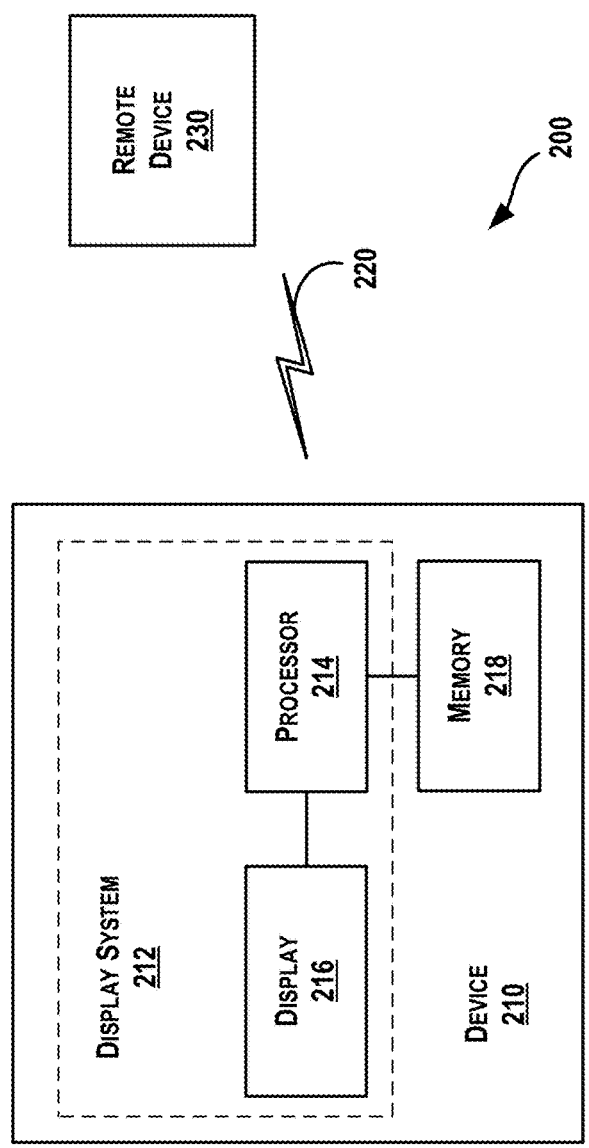
FIG. 2 is a simplified block diagram of a wearable computing device according to an example embodiment.

FIG. 2 is a simplified block diagram a wearable computing device 210 according to an example embodiment. In an example embodiment, wearable computing device 210 communicates using a communication link 220 (e.g., a wired or wireless connection) to a remote device 230. The wearable computing device 210 may be any type of device that can receive data and display information corresponding to or associated with the data. For example, the wearable computing device 210 may take the form of or include a head-mountable display, such as the head-mounted devices 102, 152, or 172 that are described with reference to FIGS. 1A to 1G.

The wearable computing device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The wearable computing device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the wearable computing device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as wearable computing device 210. Such a remote device 230 may receive data from another computing device (e.g., an HMD 102, 152, or 172 or a mobile phone), perform certain processing functions on behalf of the wearable computing 210, and then send the resulting data back to wearable computing 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 3A:
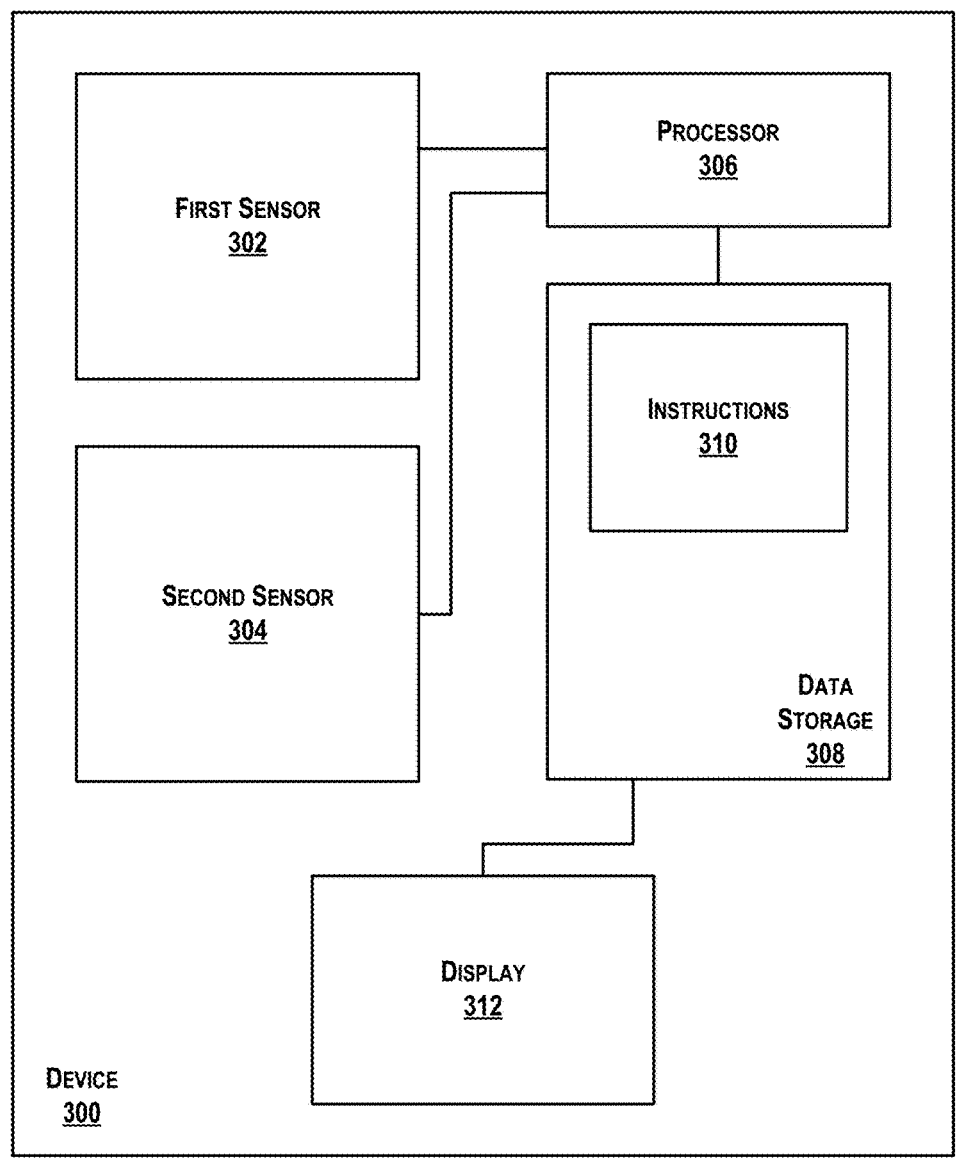
FIGS. 3A-B are a simplified block diagram (3A) and illustration (3B) of another wearable computing device according to an example embodiment.

FIG. 3A is a simplified block diagram of another wearable computing device 300 according to an example embodiment. The wearable computing device 300 may take the form of or include a head-mountable display, such as the head-mounted devices 102, 152, or 172 that are described with reference to FIGS. 1A to 1G. Alternatively or additionally, the wearable computing device 300 may take any of the forms described above for the wearable computing device 210 in connection with FIG. 2.

As shown, the wearable computing device 300 includes a first sensor 302 and a second sensor 304. The first sensor 302 may be configured to detect a touch input at the first sensor 302. To this end, the first sensor 302 may take the form of, for example, a capacitive sensor, a proximity sensor (e.g., an optical sensor), a resistance sensor, and/or a surface acoustic wave sensor, among other possibilities. Alternatively or additionally, the first sensor 302 may take any of the forms described above for the touch pad 124 described above in connection with FIG. 1A. In any case, the first sensor 302 may be configured to collect data that indicates whether there is a touch input at the first sensor 302.

In some embodiments, the first sensor 302 may be positioned on, for example, a side-arm or other frame element of the wearable computing device 300. The first sensor 302 may take other forms and positions as well.

The second sensor 304 may be configured to detect whether the wearable computing device 300 is being worn (e.g., by a user). To this end, the second sensor 302 may take the form of, for example, a proximity sensor (e.g., an optical sensor), a camera, an electrooculography sensor, and/or a sensor configured to detect eye movement (e.g., by detecting saccades, blinks, and/or an iris), among other possibilities. In any case, the second sensor 302 may be configured to collect data that indicates whether the wearable computing device 300 is being worn.

In some embodiments, the second sensor 304 may be positioned to face inward (that is, towards the user) on the wearable computing device 300. For example, the second sensor 304 may be positioned on, for example, a center frame support, component housing, or other frame element of the wearable computing device 300. The second sensor 304 may take other forms and other positions as well.

The second sensor 304 may be configured to operate in an idle mode and in an active mode. In some embodiments, the second sensor 304 operating in the idle mode may involve the second sensor 304 being powered off and not collecting data. In other embodiments, the second sensor 304 operating in the idle mode may involve the second sensor 304 being powered on (e.g., by a limited amount of power) but not collecting data. In still other embodiments, the second sensor 304 operating in the idle mode may involve the second sensor 304 being powered on (e.g., by a limited or by a full amount of power) and collecting data but not providing the data to the wearable computing device 300. The second sensor 304 may operate in the idle mode in other manners as well. The second sensor 304 operating in the active mode may involve the second sensor 304 being powered on (e.g., by a full amount of power), collecting data, and providing the data to the wearable computing device 300.

As shown, the wearable computing device 300 further includes a processor 306. The processor 306 may take any of the forms described above for the processor 214 in connection with FIG. 2. Further, as shown, the wearable computing device 300 includes data storage 308. The data storage 308 may take any of the forms described above for the memory 218 in connection with FIG. 2. As shown, the data storage 308 may include instructions 310. The instructions 310 may be accessed and executed by the processor 306. The processor 306 may be configured to execute the instructions 310 to carry out functions at the wearable computing device 300 including, for example, the functions described below in connection with FIG. 4.

The wearable computing device 300 may be configured to operate in a first state and in a second state. In some embodiments, the wearable computing device 300 may execute fewer functions and/or may execute some functions less frequently in the first state than in the second state, as described above. Alternatively or additionally, in some embodiments, the wearable computing device 300 may consume more power in the first state than in the second state. Still alternatively or additionally, in some embodiments, the wearable computing device 300 may be "locked" in the first state, while the wearable computing device 300 may be "unlocked" in the second state. When "locked," the wearable computing device 300 may be unresponsive to certain inputs (e.g., voice commands, user inputs through a touch pad, telephone calls forwarded from a cellular telephone). When "unlocked," the wearable computing device 300 may be responsive to these inputs. Other variations between the first state and the second state are possible as well.

As shown, in some embodiments the wearable computing device 300 may further include a display 312. The display 312 may take any of the forms described above for the display 216 in connection with FIG. 2. In some embodiments, the display 312 may be powered on the second state and powered down in the first state. Alternatively or additionally, in some embodiments the wearable computing device 300 may display information via the display 312 in the second state and not in the first state. Other variations between the first and the second state are possible as well.

While not shown, in some embodiments the wearable computing device 300 may further include one or more additional sensors. For example, the wearable computing device 300 may include a third sensor that, like the second sensor 304, is configured to detect whether the wearable computing device 300 is being worn. To this end, the third sensor may take the form of, for example, an accelerometer or a biometric sensor (e.g., a heart rate sensor or a body heat sensor). Other third sensors are possible as well. In any case, the third sensor may be configured to collect data that indicates whether the wearable computing device 300 is being worn.

Figure 3B:
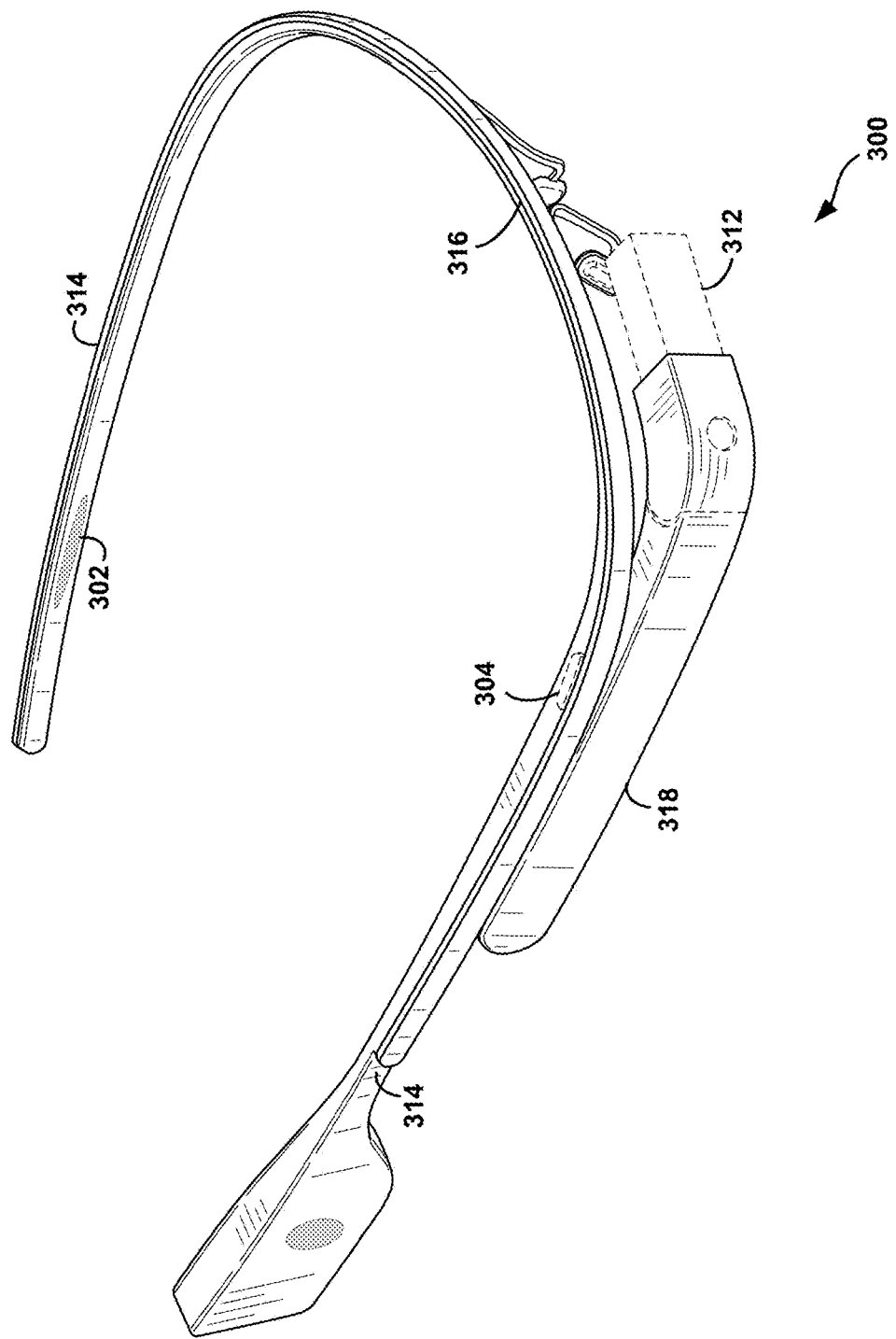

FIG. 3B is a simplified illustration of the wearable computing device 300 in accordance with an embodiment. While the wearable computing device 300 is shown having a form similar to that of the wearable computing device 210 described above in connection with FIG. 2, in other embodiments the wearable computing device 300 may take the form of or include a head-mountable display, such as the head-mounted devices 102, 152, or 172 that are described with reference to FIGS. 1A to 1G. The wearable computing device 300 may take other forms as well.

As shown, the wearable computing device 300 may include the first sensor 302 and the second sensor 304. While the first sensor 302 is shown to be positioned on an inward-facing side of a side-arm 314 of the wearable computing device 300, the first sensor 302 could alternatively be positioned elsewhere on the wearable computing device 300, such as elsewhere on the side-arm 314, on the other side-arm 314, or on a center-frame support 316. Other positions of the first sensor 302 are possible as well. As described above, the first sensor 302 may be configured to collect data that indicates whether there is a touch input at the first sensor 302. Similarly, while the second sensor 304 is shown to be positioned on an inward-facing side of the side-arm 314, the second sensor 304 could alternatively be positioned elsewhere on the wearable computing device 300, such as elsewhere on the side-arm 314, on the other side-arm 314, on the center-frame support 316, or on a component housing 318. Other positions of the second sensor 304 are possible as well. As described above, the second sensor 304 may be configured to collect data that indicates whether the wearable computing device 300 is being worn.

The wearable computing device 300 may further include the component housing 318, as mentioned above. The component housing 318 may, for example, take any of the forms described above for the component housing 176 in connection with FIG. 1D. The component housing 318 may include the processor 306 and/or the data storage 308.

While the component housing 318 is shown to be positioned on the side-arm 314 of the wearable computing device 300, other positions of the component housing 318 on the wearable computing device are possible as well. Alternatively, in some embodiments, the component housing 318 may be remote from and communicatively coupled to the wearable computing device 300. Still alternatively, in some embodiments, the processor 306 may be included the component housing 318 on the wearable computing device 300, while the data storage 308 may be remote from and communicatively coupled to the wearable computing device 300. The component housing 318, processor 306, and data storage 308 may take other forms as well. As shown, the wearable computing device 300 may further include the display 312. The display 312 may, in some embodiments, take any of the forms described above for the display 180 in connection with FIG. 1D. Alternatively, in some embodiments, take any of the forms described above for the display 158 described above in connection with FIG. 1C, or may take any of the forms described above for the lens elements 110, 112 described above in connection with FIGS. 1A-B. The display 312 may take other forms as well.

III. Example Methods

Figure 4:
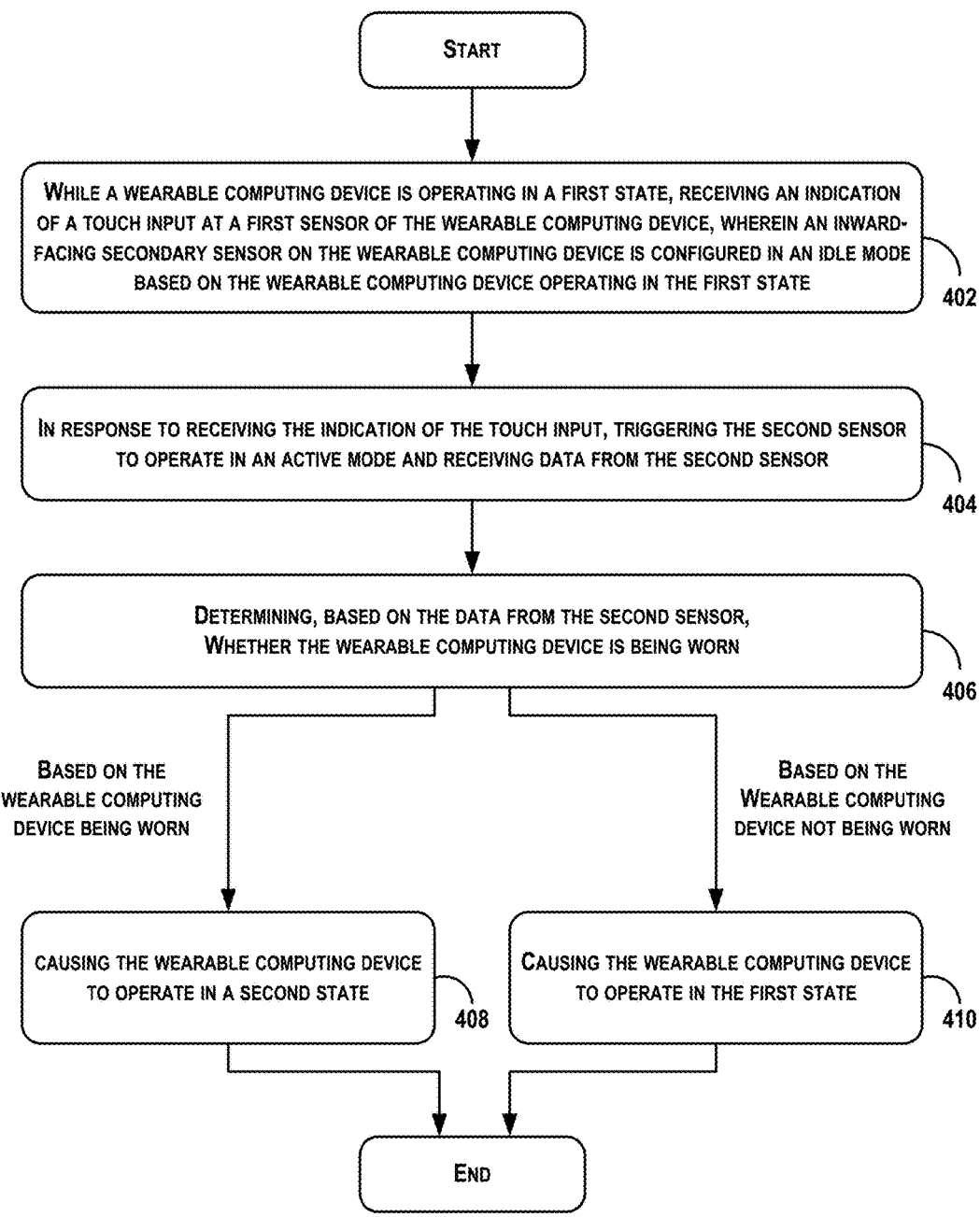
FIG. 4 is a block diagram of a method according to an example embodiment.

FIG. 4 is a block diagram of a method 400 according to an example embodiment. Method 400 presents an embodiment of a method that, for example, could be used with the systems described herein, such as the wearable computing systems 102, 152, 172 and wearable computing devices 210, 300 described above in connection with FIGS. 1A-G, 2, and 3, respectively.

The blocks 402-410 of the method 400 may be performed by a single system or by multiple systems. For example, all of the blocks 402-410 may be performed by a wearable computing device, such as the wearable computing device 300 described above in connection with FIGS. 3A-B. As another example, one or more of blocks 402-410 may be performed by a wearable computing device, such as the wearable computing device 210 described above in connection with FIG. 2, while others of blocks 402-410 may be performed by a remote device communicatively coupled to the wearable computing device, such as the remote device 230 described above in connection with FIG. 2. Other examples are possible as well.

Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 400 and other processes and methods disclosed herein, each block may represent circuitry that is configured to perform the specific logical functions in the process.

As shown, the method 400 may begin at block 402 where, while a wearable computing device is operating in a first state, the wearable computing device receives an indication of a touch input at a first sensor of the wearable computing device. Further, the first sensor may take any of the forms described above for the first sensor 302 in connection with FIGS. 3A-B. For example, in some embodiments, the first sensor may be a capacitive sensor. The first sensor may take other forms as well.

A second sensor of the wearable computing device may be configured in an idle mode based on the wearable computing device operating in the first state. The idle mode may take any of the forms described above for the second sensor 304 in connection with FIGS. 3A-B. Further, the second sensor may take any of the forms described above for the second sensor 304 in connection with FIGS. 3A-B. For example, in some embodiments, the second sensor may be a proximity sensor. The second sensor may take other forms as well.

In some embodiments, the indication of the touch input may take the form of data collected by the first sensor that indicates the touch input at the first sensor. The data collected by the first sensor may indicate the touch input at the first sensor in a number of ways.

In some embodiments, the data collected by the first sensor may indicate the touch input when the data is greater than a predetermined threshold. The predetermined threshold may be based on a minimum value detected by the first sensor when the first sensor is being touched (or nearly touched) by a user.

In embodiments where the first sensor is a capacitive sensor, the data collected by the first sensor may be expressed in terms of capacitance (e.g., in Farads). In particular, the data may be a capacitance detected by the first sensor. For instance, when the first sensor detects the touch input, the data may be approximately on the order of, e.g., femtofarads. Other values are possible as well. The detected capacitance may vary based on a distance between the first sensor and an object proximate to the first sensor. In particular, when the object is closer to the first sensor, the detected capacitance may be higher, while when the object is further from the first sensor, the detected capacitance may be lower. When no object is proximate to the first sensor, the detected capacitance may be approximately zero.

In embodiments where the data is expressed in terms of capacitance, the predetermined threshold may likewise be expressed in terms of capacitance. In particular, the predetermined threshold may be based on a minimum capacitance detected by the first sensor when the first sensor is being touched (or nearly touched) by a user. Other predetermined thresholds are possible as well.

In these embodiments, the first sensor may detect the capacitance, and may compare the data (indicating the detected capacitance) with the predetermined threshold. When the data exceeds the predetermined threshold, the first sensor may detect a touch input. When the data does not exceed the predetermined threshold, no touch input may be detected by the first sensor.

Alternatively, in other embodiments where the first sensor is a capacitive sensor, the data collected by the first sensor may be expressed in terms of voltage (e.g., in volts). In particular, the data may be a voltage (e.g., as determined by a driver circuit) that indicates the capacitance detected by the first sensor.

In embodiments where the data is expressed in terms of voltage, the predetermined threshold may likewise be expressed in terms of voltage. In particular, the predetermined threshold may be based on a voltage indicating a minimum capacitance detected by the first sensor when the first sensor is being touched (or nearly touched) by a user. Other predetermined thresholds are possible as well.

In these embodiments, the first sensor may detect the capacitance, determine data (expressed as a voltage) indicating the detected capacitance, and may compare the data with the predetermined threshold. When the data exceeds the predetermined threshold, the first sensor may detect a touch input. When the data does not exceed the predetermined threshold, no touch input may be detected by the first sensor.

While the foregoing described the data collected by the first sensor in terms of capacitance and voltage, in general, the data may be any digital value that indicates the detected capacitance. To this end, the wearable computing device may include an integrated circuit that is configured to convert the detected capacitance into a digital signal for use as the data. The integrated circuit may convert the detected capacitance into the digital signal using, for example, an analog timer circuit that converts the capacitance to a frequency and/or an operational amplifier circuit that converts the capacitance to a frequency. The integrated circuit may be configured for passive or active compensation. The integrated circuit may digitize the detected capacitance in other manners as well. Any digitized capacitance may be compared with a predetermined threshold and/or predetermined range, as described above.

Alternatively or additionally, in some embodiments the data collected by the first sensor may indicate a pressure on the first sensor. In these embodiments, the first sensor may detect the pressure, determine data indicating the pressure, and may compare the data with a predetermined threshold. The predetermined threshold may, for example, be based on a minimum pressure detected by the first sensor when the first sensor is being touched (or nearly touched) by a user. When the data exceeds the predetermined threshold, the first sensor may detect a touch input. When the data does not exceed the predetermined threshold, no touch input may be detected by the first sensor.

In still other embodiments, rather than comparing data collected by the first sensor with a predetermined threshold, the data collected by the first sensor may be compared with a predetermined range that is defined by a minimum and a maximum. Each of the minimum and the maximum may be based on, for example, a calibration of the first sensor. For instance, calibration may indicate that the first sensor is being touched (or nearly touched) by a user when the data is between a first value (e.g., $x_1$) and a second value (e.g., $x_2$), and that the first sensor is not being touched (or nearly touched) by the user when the data is not between the first value and the second value. In these embodiments, the minimum of the predetermined range may be the first value, while the maximum value may be the second value. Alternatively, to accommodate measurement errors in the first sensor, each of the minimum and the maximum may be determined based on the first value and the second value, respectively, as well as a difference between the first and the second value. In particular, the minimum may be any value less than the second value minus, e.g., 75% of the difference between the first value and the second value (e.g., less than $x_2 - 0.75(x_2 - x_1)$). Similarly, the maximum may be any value greater than the first value plus, e.g., 75% of the difference between the first value and the second value (e.g., greater than $x_1 + 0.75(x_2 - x_1)$). Other minimums and maximums are possible as well.

As noted above, in embodiments where the first sensor is a capacitive sensor, the data collected by the first sensor may be expressed in terms of capacitance (e.g., in Farads) or voltage (e.g., in volts). Similarly, the predetermined range, like the predetermined threshold described above, may be expressed in terms of capacitance or voltage as well.

In either case, the first sensor may collect the data and may compare the data with the predetermined range. When the data is within the predetermined range, the first sensor may detect a touch input. When the data does is not within the predetermined range, no touch input may be detected by the first sensor.

In some embodiments, the wearable computing device may receive an indication of a touch input each time the first sensor detects a touch input. Alternatively or additionally, in some embodiments the wearable computing device may receive an indication of a touch input each time the first sensor detects a touch input for at least a predetermined period of time. The predetermined amount of time may be, for example, on the order of milliseconds. Other amounts of time are possible as well. The amount of time may be selected to balance, for example, avoiding false positives resulting from inadvertent touch inputs at the first sensor and minimizing latency that may undermine a user's experience. To this end, in embodiments where the data collected by the first sensor is compared with a predetermined value or a predetermined range, the amount of time and the predetermined value or range may be selected in light of one another (e.g., for a narrower predetermined range, which will minimize false positives, a shorter amount of time may be selected). Still alternatively or additionally, in some embodiments the wearable computing device may receive an indication of a touch input when the first sensor has detected at least a threshold number of touch inputs within a predetermined period of time. The wearable computing device may receive the indication of the touch input in other manners as well.

The method 400 continues at block 404 with, in response to receiving the indication of the touch input, triggering the second sensor to operate in an active mode and receiving data from the second sensor.

As noted above, the second sensor operating in an idle mode may take a number of forms. In embodiments where the second sensor operating in the idle mode involves the second sensor being powered off and not collecting data, triggering the second sensor to operate in the active mode may involve powering on the second sensor, triggering the second sensor to collect the data, and requesting the data from the second sensor. In embodiments where the second sensor operating in the idle mode involves the second sensor being powered on (e.g., by a limited amount of power) but not collecting data, triggering the second sensor to operate in the active mode may involve powering the second sensor by a full amount of power, triggering the second sensor to collect the data, and requesting the data from the second sensor. In embodiments where the second sensor operating in the idle mode involves the second sensor being powered on (e.g., by a limited or by a full amount of power) and collecting data but not providing the data to the wearable computing device, triggering the second sensor to operate in the active mode may involve powering the second sensor by a full amount of power (if previously powered only by a limited amount of power), and requesting the data. The second sensor may be triggered to operate in the active mode in other manners as well. In general, the second sensor may be powered on (e.g., by a full amount of power), collecting data, and providing the data to the wearable computing device while in the active mode.

At block 406, the method 400 continues with determining, based on the data from the second sensor, whether the wearable computing device is being worn. In some embodiments, such as those in which the second sensor is a proximity sensor (e.g., an optical sensor), the data may indicate whether an eye is detected. To this end, the proximity sensor may be configured to emit an infrared light and detect reflections of the infrared light. Based on the detected reflections, the proximity sensor may determine whether an eye is detected. In these embodiments, the data may be expressed in, for example, a binary (e.g., 0 if an eye is not detected and 1 if an eye is detected). The wearable computing device may determine that the wearable computing device is being worn when the data indicates that an eye is detected, and may determine that the wearable computing device is not being worn when the data indicates that an eye is not detected.

Alternatively, in some embodiments, such as those in which the second sensor is a proximity sensor, the data may indicate a distance to an eye. To this end, the proximity sensor may be configured to emit an infrared light and detect reflections of the infrared light. A power level and pulse width of the emitted infrared light may be controlled by software. In detecting the infrared light, the proximity sensor may determine a length of time between emitting the infrared light and detecting the reflection and a reflectivity of any object (e.g., an eye) off which the reflections were reflected. Based on the length of time and the reflectivity, the proximity sensor may determine whether an eye was detected and, if so, a distance to the eye. The proximity sensor may further determine data that indicates the distance. In some embodiments, a higher value of the data may indicate a shorter distance, while a lower value of the data may indicate a longer distance. In order to determine whether the wearable computing device is being worn, the wearable computing device may compare the data to a predetermined threshold. The predetermined threshold may be based on a minimum value detected by the second sensor when the wearable computing device is being worn. For example, in embodiments where the data collected by the second sensor indicates a distance to an eye, the predetermined threshold may be based on a maximum distance between the second sensor and an eye when the wearable computing device is being worn.

In these embodiments, the second sensor may collect the data (indicating the distance) and provide the data to the wearable computing device, and the wearable computing device may compare the data with the predetermined threshold. When the data exceeds the predetermined threshold (such that the distance indicated by the data is shorter than the maximum distance indicated by the predetermined threshold), the wearable computing device may determine that it is being worn. When the data does not exceed the predetermined threshold, the wearable computing device may determine that it is not being worn.

In other embodiments, rather than comparing data collected by the second sensor with a predetermined threshold, the data collected by the second sensor may be compared with a predetermined range that is defined by a minimum and a maximum. Each of the minimum and the maximum may be based on, for example, a calibration of the second sensor. For instance, calibration may indicate that the wearable computing device is being worn by a user when the data is between a first value (e.g., $y_1$) and a second value (e.g., $y_2$), and that the wearable computing device is not being worn by the user when the data is not between the first value and the second value. In these embodiments, the minimum of the predetermined range may be the first value, while the maximum value may be the second value. Alternatively, to accommodate measurement errors in the second sensor, each of the minimum and the maximum may be determined based on the first value and the second value, respectively, as well as a difference between the first and the second value. In particular, the minimum may be any value less than the second value minus, e.g., 75% of the difference between the first value and the second value (e.g., less than $y_2-0.75(y_2-y_1)$). Similarly, the maximum may be any value greater than the first value plus, e.g., 75% of the difference between the first value and the second value (e.g., greater than $y_1+0.75(y_2-y_1)$). Other minimums and maximums are possible as well.

As noted above, in some embodiments, such as those in which the second sensor is a proximity sensor, the data may be expressed as a voltage (e.g., in volts). Similarly, the predetermined range, like the predetermined threshold described above, may be expressed in terms of voltage. Other predetermined ranges are possible as well.

In any case, the second sensor may collect the data and provide the data with the wearable computing device, and the wearable computing device may compare the data with the predetermined range. When the data is within the predetermined range, the wearable computing device may determine that it is being worn. When the data does is not within the predetermined range, the wearable computing device may determine that it is not being worn.

Still alternatively, in some embodiments, such as those in which the second sensor is an electrooculography sensor and/or a sensor configured to detect eye movement (e.g., by detecting saccades, blinks, and/or an iris), the data may take the form of a signal indicating an electrooculogram and/or a signal indicating eye movement, respectively. In these embodiments, the second sensor may collect the data (having the form of the signal indicating the electrooculogram and/or the eye movement) and provide the data to the wearable computing device. In order to determine whether the wearable computing device is being worn, the wearable computing device may compare the data with, for example, a characteristic signal shape. The characteristic signal shape may be predetermined based on, for example, a signal indicating an electrooculogram and/or eye movement when the wearable computing device is being worn.

Based on the comparison of the data with the characteristic signal shape, the wearable computing device may determine whether the wearable computing device is being worn. For example, if the data is substantially similar to the characteristic signal shape, the wearable computing device may determine that the wearable computing device is being worn, while if the data is not substantially similar to the characteristic signal shape, the wearable computing device may determine that the wearable computing device is not being worn. The wearable computing device may determine that the data is substantially similar to the characteristic signal shape when, for example, deviations between the data and the characteristic signal shape are sufficiently infrequent or minimal and/or when similarities between the data and the characteristic signal shape are sufficiently frequent or significant. For instance, the wearable computing device may determine that the data and the characteristic signal shape are substantially similar when values in the data (or a threshold percentage of values in the data) are within a predetermined range of values in the characteristic signal shape. Other examples are possible as well.

As noted above, in some embodiments the wearable computing device may further include one or more additional sensors, such as, for example, an accelerometer or a biometric sensor (e.g., a heart rate sensor or a body heat sensor). In these embodiments, the additional sensor(s) may, like the second sensor, be configured to collect data that indicates whether the wearable computing device is being worn. In embodiments where the additional sensor(s) is an accelerometer or a heart rate sensor, the data may take the form of, for example, a signal indicating movement of the wearable computing device (in the case of the accelerometer) or a signal indicating the heart rate (in the case of the heart rate sensor). The additional sensor(s) may provide the data to the wearable computing device. In order to determine whether the wearable computing device is being worn, the wearable computing device may compare the data with, for example, a characteristic signal shape. The characteristic signal shape may be predetermined based on, for example, a signal indicating a movement of the wearable computing device (in the case of the accelerometer) or a signal indicating the heart rate of a user.

In embodiments where additional sensor(s) are included in the wearable computing device, the additional sensor(s) may, like the second sensor, be configured to operate in an idle mode while the wearable computing device operates in the first state, and may be triggered to operate in an active mode in response to the wearable computing device receiving data indicating the touch input at the first sensor. Further in response to the wearable computing device receiving data indicating the touch input at the first sensor, the wearable computing device may receive data from the additional sensor(s). Based on the data from the second sensor and the additional sensor(s), the wearable computing device may determine whether the wearable computing device is being worn.

In some embodiments, the wearable computing device may determine that it is being worn when, for example, data from each of the second sensor and the additional sensor(s) indicates that the wearable computing device is being worn. Alternatively, in some embodiments, the wearable computing device may determine that it is being worn when data from a majority of the second sensor and the additional sensor(s) indicates that the wearable computing device is being worn. Still alternatively, in some embodiments, the wearable computing device may determine that it is being worn when data from or a threshold number of the second sensor and the additional sensor(s) indicates that the wearable computing device is being worn. Other examples are possible as well.

While the second sensor was described above as taking the form of proximity sensor (e.g., an optical sensor), a camera, an electrooculography sensor, and/or a sensor configured to detect eye movement (e.g., by detecting saccades, blinks, and/or an iris), and the additional sensor(s) was described above as taking the form of an accelerometer or biometric sensor, in other embodiments the second sensor may take any of the forms described for the additional sensor(s), and the additional sensor(s) may take any of the forms described for the second sensor.

The wearable computing device may determine whether the wearable computing device is being worn in other manners as well.

Based on the wearable computing device being worn, the method 400 may continue at block 408 with causing the wearable computing device to operate in a second state. On the other hand, based on the wearable computing device not being worn, the method 400 may continue at block 410 with causing the wearable computing device to operate in the first state.

The first state and the second state may differ from one another in a number of manners. In some embodiments, the wearable computing device 300 may be configured to execute additional functionality in the second state as compared to the first state. For example, the wearable computing device 300 may execute fewer functions and/or may execute some functions less frequently in the first state than in the second state, as described above. Alternatively or additionally, in some embodiments, the wearable computing device 300 may be configured to consume more power in the first state than in the second state. Still alternatively or additionally, in some embodiments, the wearable computing device 300 may be configured to be "locked" in the first state, while the wearable computing device 300 may be configured to be "unlocked" in the second state. When "locked," the wearable computing device 300 may be unresponsive to certain inputs (e.g., voice commands, user inputs through a touch pad, telephone calls forwarded from a cellular telephone). When "unlocked," the wearable computing device 300 may be responsive to these inputs. Other variations between the first state and the second state are possible as well. A number of examples are described below.

As one example, a display of the wearable computing device may be powered on in the second state but powered down in the first state. As another example, the wearable computing device may be configured to receive telephone calls that are forwarded to the wearable computing device in the second state but may be configured to reject such calls in the first state. As yet another example, one or more sensors on the wearable computing device may be powered on in the second state but powered down in the first state, or may collect data with a higher frequency in the second state than in the first state. As still another example, the wearable computing device may be configured to provide one or more notifications (e.g., visual, audio, and/or haptic notifications) in the second state but not in the first state. As yet another example, the wearable computing device may be configured to provide one or more notifications (e.g., visual, audio, and/or haptic notifications) in the second state but to push notifications to another device (e.g., a remote device) in the first state. As still another example, the wearable computing device may be configured to emit audio (e.g., music) in the second state, but to cease emitting audio in the first state. As yet another example, a display of the wearable computing device may be powered on in the second state and powered down in the first state. As still another example, the wearable computing device may display information via the display in the second state and not in the first state. Other examples are possible as well.

In embodiments where the method 400 continues at block 410, the method 400 may begin again at block 402 when the wearable computing device next receives an indication of a touch input at the first sensor. To this end, the first sensor may collect data continuously or periodically and may provide the indication of the touch input to the wearable computing device in any of the manners described above in connection with block 402. Alternatively, in embodiments where the method 400 continues at block 410, the method 402 may begin again at block 402 after a predetermined period of time.

In embodiments where the method 400 continues at block 408, the wearable computing device may continue operating in the second state until, for example, the wearable computing device has not received an indication of a touch input at the first sensor for a predetermined period of time and/or the second sensor has not detected that the wearable computing device is being worn for a predetermined period of time.

In some embodiments, the wearable computing device may default to the first state upon being powered on, and may remain in the first state until the wearable computing device both receives the indication of the touch input and determines, based on the data from the second sensor, that the wearable computing device is being worn, as described above. In other embodiments, the wearable computing device may default to the second state upon being powered on, but may change to the first state when, for example, the wearable computing device has not received an indication of a touch input at the first sensor for a predetermined period of time and/or the second sensor has not detected that the wearable computing device is being worn for a predetermined period of time. Other examples are possible as well.

IV. Alternative Embodiments

While the foregoing description focused on a wearable computing device that is configured to be worn on a face of a user, in an alternative embodiment the systems and methods described could be used in connection with another wearable computing device, such as a headphone or set of headphones. In these embodiments, the first sensor may similarly be configured to collect data indicating a touch input at the first sensor, and the second sensor may similarly be configured to collect data indicating whether the wearable computing device is being worn. For example, in embodiments where the wearable computing device takes the form of a headphone, the data collected by the second sensor may indicate whether the headphone is being worn in, on, and/or over an ear of the user. To this end, the second sensor may take the form of a proximity sensor, an accelerometer, and/or a biometric sensor, as described above. The second sensor may take other forms as well.

V. Conclusion

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

We claim:

1. A method comprising:
   while a head-mountable device (HMD) is operating in a first state:
   initially operating a first sensor on the HMD in an active mode and an inward-facing second sensor on the HMD in an idle mode;
   receiving an indication of a touch input at a first sensor on the HMD; and in response to receiving the indication of the touch input: (a) triggering the second sensor to operate in an active mode, (b) operating the second sensor to obtain data indicative of whether an eye is proximate to the HMD, and (c) determining, based on the data indicative of whether an eye is proximate, whether the HMD is being worn;

if it is determined that the HMD is not being worn, then continuing operation of the HMD in the first state; and otherwise, if it is determined that the HMD is being worn, then causing the HMD to switch to operation in a second state.

2. The method of claim 1, further comprising:
based on the HMD being worn, causing the HMD to operate in a second state, wherein the HMD is configured to execute additional functionality in the second state as compared to the first state; and
based on the HMD not being worn, causing the HMD to operate in the first state.

3. The method of claim 1, further comprising:
based on the HMD being worn, causing the HMD to operate in a second state, wherein the HMD is configured to consume more power in the second state than in the first state; and
based on the HMD not being worn, causing the HMD to operate in the first state.

4. The method of claim 1, further comprising:
based on the HMD being worn, causing the HMD to operate in a second state, wherein the HMD is configured to be unlocked in the second state, and wherein the HMD being configured to be unlocked comprises the HMD being configured to be responsive to a plurality of inputs; and
based on the HMD not being worn, causing the HMD to operate in the first state, wherein the HMD is locked in the first state, and wherein the HMD being configured to be locked comprises the HMD being configured to be unresponsive to at least one of the plurality of inputs.

5. The method of claim 1, wherein the HMD being worn comprises the HMD being worn on a face of a user.

6. The method of claim 1, wherein the HMD being worn comprises the HMD being (i) worn on a face of a user and (ii) in use.

7. The method of claim 1, wherein the HMD receiving the indication of the touch input comprises the first sensor detecting at least a threshold number of touch inputs at the first sensor within a predetermined period of time.

8. The method of claim 1, wherein determining, based on the data from the second sensor, whether the HMD is being worn comprises:
comparing the data from the second sensor to a predetermined threshold, wherein the predetermined threshold is based on a minimum value detected by the second sensor when the HMD is being worn;
based on the data from the second sensor being greater than the predetermined threshold, determining that the HMD is being worn; and
based on the data from the second sensor being less than the predetermined threshold, determining that the HMD is not being worn.

9. The method of claim 1, wherein determining, based on the data from the second sensor, whether the HMD is being worn comprises:
comparing the data from the second sensor to a characteristic signal shape, wherein the characteristic signal shape is based on a signal shape detected by the second sensor when the HMD is being worn;

based on the data from the second sensor being substantially similar to the characteristic signal shape, determining that the HMD is being worn; and
based on the data from the second sensor not being substantially similar to the characteristic signal shape, determining that the HMD is not being worn.

10. The method of claim 1, wherein:
the second sensor being configured in the idle mode comprises the second sensor being powered down; and
triggering the second sensor to operate in the active mode comprises (i) powering on the second sensor and (ii) requesting the data from the second sensor.

11. The method of claim 1, wherein the second sensor operating in the active mode comprises the second sensor (i) being powered on, (ii) collecting the data, and (iii) providing the data to the HMD.

12. A computer readable storage memory having stored therein instructions that, when executed by a processor, cause the processor to perform functions comprising:
while a head-mountable device (HMD) is operating in a first state:
initially operating a first sensor on the HMD in an active mode and an inward-facing second sensor on the HMD in an idle mode;
receiving an indication of a touch input at a first sensor on the HMD; and
in response to receiving the indication of the touch: (a) triggering the second sensor to operate in an active mode, (b) operating the second sensor to obtain data indicative of whether an eye is proximate to the HMD, and (c) determining, based on the data indicative of whether an eye is proximate, whether the HMD is being worn;
if it is determined that the HMD is not being worn, then continuing operation of the HMD in the first state; and
otherwise, if it is determined that the HMD is being worn, then causing the HMD to switch to operation in a second state.

13. The computer readable storage memory of claim 12, wherein the functions further comprise:
based on the HMD being worn, causing the HMD to operate in a second state, wherein the HMD is configured to execute additional functionality in the second state as compared to the first state; and
based on the HMD not being worn, causing the HMD to operate in the first state.

14. The computer readable storage memory of claim 12, wherein the functions further comprise:
based on the HMD being worn, causing the HMD to operate in a second state, wherein the HMD is configured to consume more power in the second state than in the first state; and
based on the HMD not being worn, causing the HMD to operate in the first state.

15. The computer readable storage memory of claim 12, wherein the functions further comprise:
based on the HMD being worn, causing the HMD to operate in a second state, wherein the HMD is configured to be unlocked in the second state, and wherein the HMD being configured to be unlocked comprises the HMD being configured to be responsive to a plurality of inputs; and
based on the HMD not being worn, causing the HMD to operate in the first state, wherein the HMD is locked in the first state, and wherein the HMD being configured to be locked comprises the HMD being configured to be unresponsive to at least one of the plurality of inputs.

16. The computer readable storage memory of claim 12, wherein the second sensor operating in the active mode comprises the second sensor (i) being powered on, (ii) collecting the data, and (iii) providing the data to the HMD.

17. A wearable computing device comprising:
a first sensor;
a second sensor, wherein the second sensor is arranged as inward-facing on the wearable computing device such that to the second sensor is operable to obtain data indicative of whether an eye is proximate to the wearable computing device when the wearable computing device is worn;
a processor; and
data storage comprising instructions executable by the processor to carry out functions including:
while the wearable computing device is operating in a first state:
(i) initially operating the first sensor in an active mode and the inward-facing second sensor in an idle mode,
(ii) receiving an indication of a touch input at the first sensor,
(iii) in response to receiving the indication of the touch input: (a) triggering the second sensor to operate in an active mode, (b) operating the second sensor to obtain data indicative of whether an eye is proximate to the wearable computing device, and (c) determining, based on the data indicative of whether an eye is proximate, whether the wearable computing device is being worn;
if it is determined that the wearable computing device is not being worn, then continuing operation of the HMD in the first state; and
otherwise, if it is determined that the wearable computing device is being worn, then causing the HMD to switch to operation in a second state.

18. The wearable computing device of claim 17, wherein the first sensor comprises a capacitive sensor.

19. The wearable computing device of claim 17, wherein the second sensor comprises a camera.

20. The wearable computing device of claim 17, wherein the functions further comprise:
based on the wearable computing device being worn, causing the wearable computing device to operate in a second state, wherein the wearable computing device is configured to be unlocked in the second state, and wherein the wearable computing device being configured to be unlocked comprises the wearable computing device being configured to be responsive to a plurality of inputs; and
based on the wearable computing device not being worn, causing the wearable computing device to operate in the first state, wherein the wearable computing device is locked in the first state, and wherein the wearable computing device being configured to be locked comprises the wearable computing device being configured to be unresponsive to at least one of the plurality of inputs.

21. The method of claim 1, wherein the second sensor comprises a proximity sensor having an emitter and receiver, wherein the proximity sensor is arranged on the HMD such that light emitted from the emitter is directed toward a corresponding eye when the HMD is worn, and such that the receiver detects emitted light that is reflected from the eye.

22. The method of claim 21, wherein determining whether the HMD is being worn comprises:
using the proximity sensor to determine a measure of distance;
comparing the determined measure of distance to a threshold distance, wherein the threshold distance corresponds to a location of the proximity sensor relative to a corresponding eye when the HMD is worn; and
based on the comparison, determining whether the measure of distance is indicative of the HMD being worn.

23. The method of claim 21, wherein determining whether the HMD is being worn comprises:
using the proximity sensor to determine a measure of distance;
comparing the determined measure of distance to a predetermined distance range, wherein the predetermined distance range corresponds to a location of the proximity sensor relative to a corresponding eye when the HMD is worn; and
based on the comparison, determining whether the measure of distance is indicative of the HMD being worn.

* * * * *